United States Patent [19]
Kim et al.

[11] Patent Number: 5,910,715
[45] Date of Patent: Jun. 8, 1999

[54] CURRENT CONTROL APPARATUS IN DC MOTOR

[75] Inventors: Jong Gun Kim, Kyung Nam; Seong Chul Huh, Taegu; Ki Ryong Kwon, Kyung Nam, all of Rep. of Korea

[73] Assignee: Samsung Heavy Industries Co., Ltd., Seoul, Rep. of Korea

[21] Appl. No.: 08/910,824

[22] Filed: Aug. 13, 1997

Related U.S. Application Data

[63] Continuation-in-part of application No. 08/564,759, Nov. 29, 1995.

[30] Foreign Application Priority Data

Mar. 30, 1995 [KR] Rep. of Korea .................. 95-6981

[51] Int. Cl.$^6$ ................................................ H02K 23/00
[52] U.S. Cl. ...................... 318/254; 318/139; 318/684; 318/376
[58] Field of Search .................... 318/139, 684, 318/376, 135, 338, 345 R, 561, 254; 320/3

[56] References Cited

U.S. PATENT DOCUMENTS

| | | | |
|---|---|---|---|
| 3,679,957 | 7/1972 | Farque | 318/684 |
| 4,358,725 | 11/1982 | Brendemuehl | 318/696 |
| 5,136,219 | 8/1992 | Takahashi et al. | 318/139 |
| 5,654,613 | 8/1997 | Kim et al. | 318/139 |

Primary Examiner—William M. Shoop, Jr.
Assistant Examiner—Rita Leykin
Attorney, Agent, or Firm—Kenyon & Kenyon

[57] ABSTRACT

The present invention provides a current control apparatus for a DC motor system having a motor field coil and a motor armature and driven by the power of a battery, and a chopper transistor for controlling the amount of the current supplied to the DC motor from the battery, which current control apparatus has current amplifying means for detecting the current amount at the rear end of the motor and amplifying the current value; on-off control means for comparing the input current with the current supplied from the current amplifying means and outputting an on-off control signal according to the current amount; and a microcomputer for controlling the duty value of the pulse wave of a predetermined frequency occurring in accordance with the on-off control signal from the on-off control means and controlling the on-off time of the chopper transistor. The microcomputer performs the following steps: a step for determining whether or not an interrupt counter is an initial state, setting an initial state if yes and setting the outputting pulse limiting value of the microcomputer; a step for determining whether or not the duty value of the microcomputer output pulse is 0 in case of non-initial state of the interrupt counter; and a step for comparing the interrupt counter is not in the initial state, whether the predetermined current limit value is 0; comparing, if the predetermined current limit value is not 0, the state of said interrupt counter with said predetermined current limit value and thereby controlling an on-off state of said chopper transistor; and turning off said chopper transistor if the predetermined current limit value is 0.

6 Claims, 6 Drawing Sheets

CURRENT CONTROL APPARATUS IN DC MOTOR

This application is a continuation-in-part application of application Ser. No, 08/564,759, filed on Nov. 29, 1995.

BACKGROUND OF THE INVENTION

1. Field of the Invention

The present invention relates in general to a current control apparatus used in direct current (DC) motors and more particularly to a current control apparatus in which the driving state of the motor in battery driven electric vehicles is controlled by the current value.

2. Description of the Prior Art

Generally, battery driven apparatus such as electric forklifts, small electric cars, oil pressure device and swelling pumps use DC motors and DC motor controllers. These types of DC motors usually use a voltage control method.

FIG. 1 shows a pair of filtering condensers 2 and 3 for filtering the power from the battery 1, a motor field coil 4 and a motor armature 5 driven by the battery, a chopper transistor 6 for switching the battery power to motor field coil 4 and motor armature 5, a pair of forward and backward contactors 7 and 8 for controlling the polarity of the motor field coil 4, regeneration excitation circuit 9 for returning the energy generated by the motor system to the battery 1, regeneration excitation contactor 10 for switching the regeneration excitation circuit 9, and a microcomputer 11 for controlling the above.

Operations of the power circuit of DC motor will be described in detail hereinbelow.

Power from the battery 1 is filtered by the filtering condensers 2 and 3 and applied to the chopper transistor 6. The chopper transistor 6 performs switching operation of the battery power which is on-off controlled by the control signal of the microcomputer 11 to the motor field coil 4 and the motor armature 5. The battery power is supplied to the motor field coil 4 and the motor armature 5 and then the motor begins to drive.

The battery 1 is charged by turning off the regeneration excitation circuit and regenerated when energy from the motor is supplied to the battery 1 through the regeneration diode 12. Thus the motor system loses kinetic energy and brakes.

However, there is a problem that the power circuit of DC motor is not efficiently controlled because the power circuit of the DC motor is made to control the input power required for driving the motor, the capacity of the filtering condenser on the input end is limited, and as a result, the input voltage cannot be increased above the predetermined value.

Also, there is another problem in that if the motor is used for a long time, the internal resistance of the motor will change depending on the temperature, and the inductance value in the motor will change, thereby causing instability in current control.

SUMMARY OF THE INVENTION

The object of the present invention is to control the amount of the current supplied to the DC motor and the driving state of the DC motor, thereby providing a current control apparatus for DC motors which achieves direct control, high efficiency and safe circuit operation.

In order to achieve the object, the present invention provides a current control apparatus for a DC motor system having a motor field coil and a motor armature and driven by the power of a battery, and a chopper transistor for controlling the amount of the current supplied to the DC motor from the battery, said current control apparatus comprising current amplifying means for detecting the current amount at the rear end of the motor and amplifying the current value; on-off control means for comparing the input current with the current supplied from the current amplifying means and outputting an on-off control signal according to the current amount; and a microcomputer for controlling the duty value of the pulse wave of a predetermined frequency occurring in accordance with the on-off control signal from the on-off control means and controlling the on-off time of the chopper transistor.

The microcomputer performs the following steps: a step for determining whether or not an interrupt counter at an initial state, setting the initial state if yes and setting the output pulse limiting value of the microcomputer; a step for determining whether or not the duty value of the microcomputer output pulse is 0 in case of the interrupt counter is at a noninitial state and a step for comparing the interrupt counter is not in the initial state, whether the predetermined current limit value is 0; comparing, if the predetermined current limit value is not 0, the state of said interrupt counter with said predetermined current limit value and thereby controlling the on/off state of said chopper transistor; and turning off said chopper transistor if the predetermined current limit value is 0.

DETAILED DESCRIPTION OF THE PREFERRED EMBODIMENT

Figure 1:
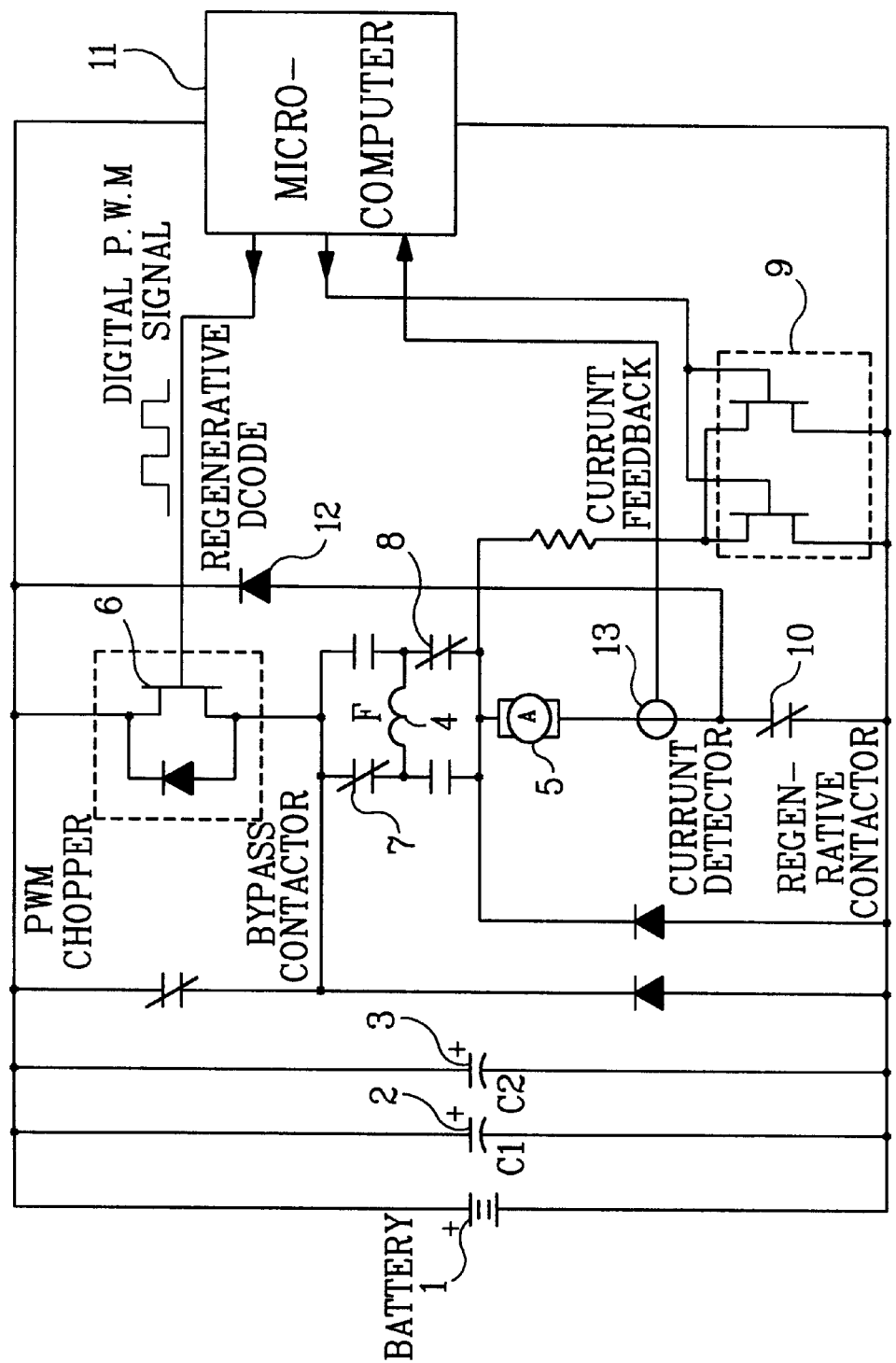
FIG. 1 is a circuit diagram of the conventional direct current motor controller.
Figure 2:
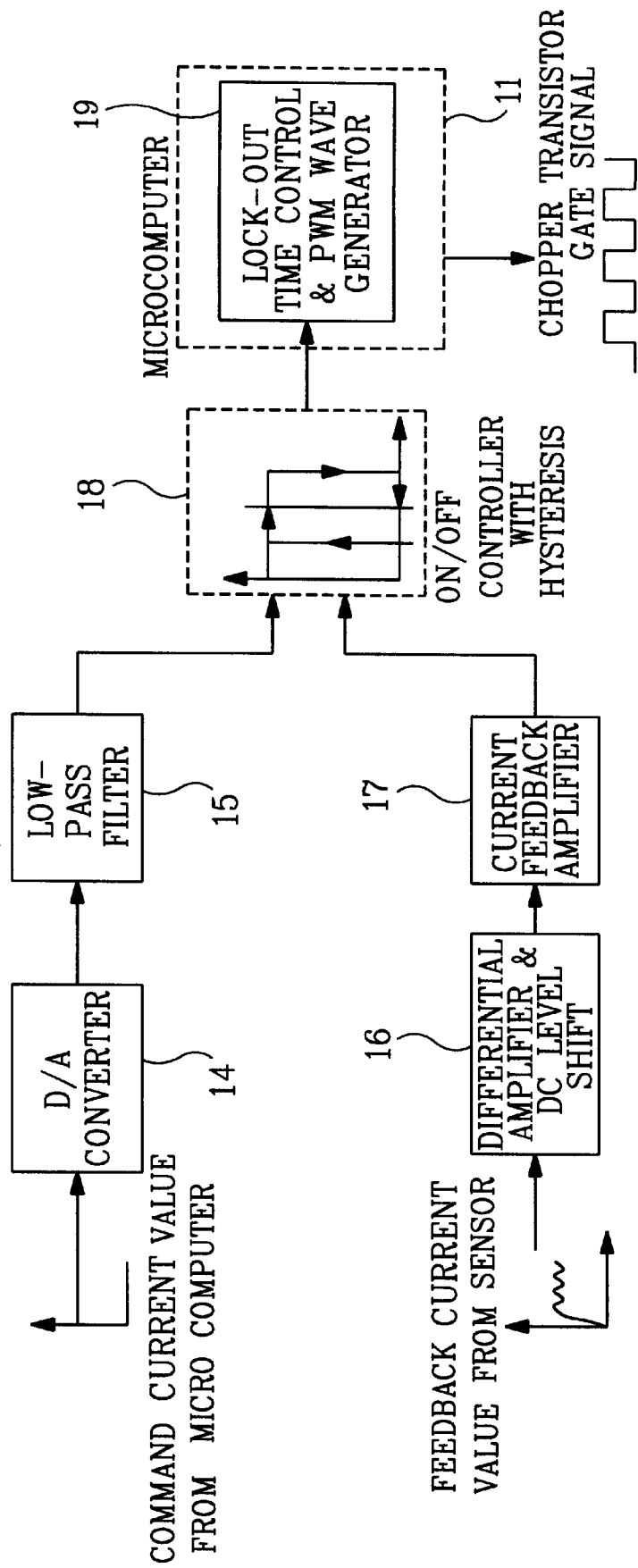
FIG. 2 is a schematic block diagram of the current control apparatus of direct current motor in accordance with the present invention.

FIG. 2 is a schematic block diagram of the current loop of a DC motor current controller of the present invention. FIG. 2 shows a basic circuit added to the power circuit depicted in FIG. 1. In this configuration of the basic circuit, hysteresis ON/OFF controller 18 compares the current command value of microcomputer 11 and the motor current detected from current detector 13, and the current limit information output from the controller 18 is received to generate a required frequency limit function and a gate driving digital PWM signal. Here, the digital PWM signal is produced according to the internal program of microcomputer 11.

Referring to FIG. 2, the circuit includes a digital-to-analog converter 14 for converting the digital current command value output from microcomputer 11 into an analog current value, a low-pass filter 15 for filtering the high-frequency band component of the analog current value converted into converter 14 in order to remove its ripple component, a level shifter 16 for changing the level of the current value detected from current detector 13 shown in FIG. 1, the feedback current value flowing through the motor system, to a reference level, a feedback current amplifier 17 for amplifying the feedback current changed by the level shifter, and a hysteresis on/off controller 18 for comparing the current command value input from low-pass filter 15 and the feedback current value input from feedback current amplifier 17 to provide an on/off logic signal containing current limit information.

Figure 3A:
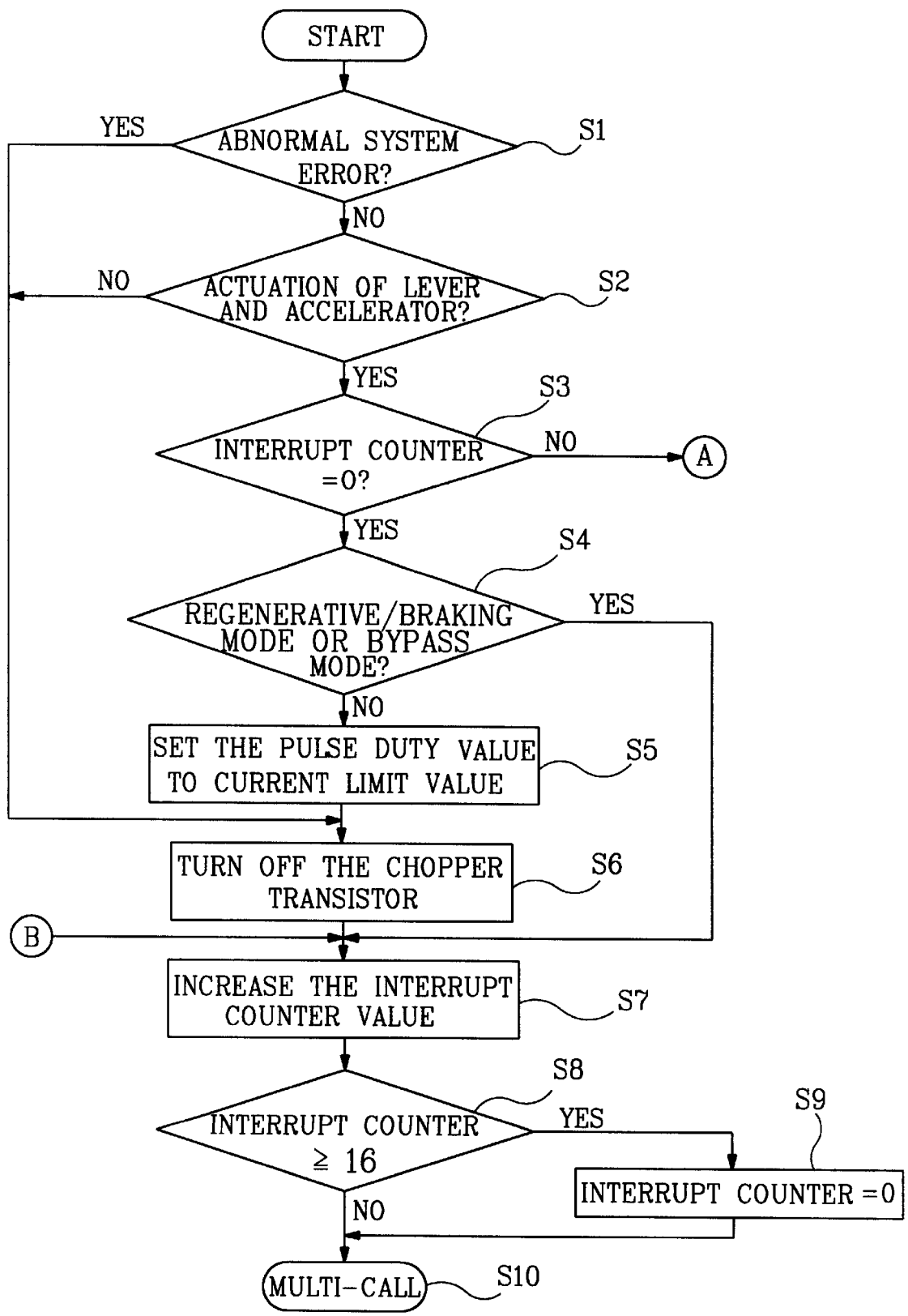
FIGS. 3A and 3B are flow charts of the present invention.
Figure 3B:
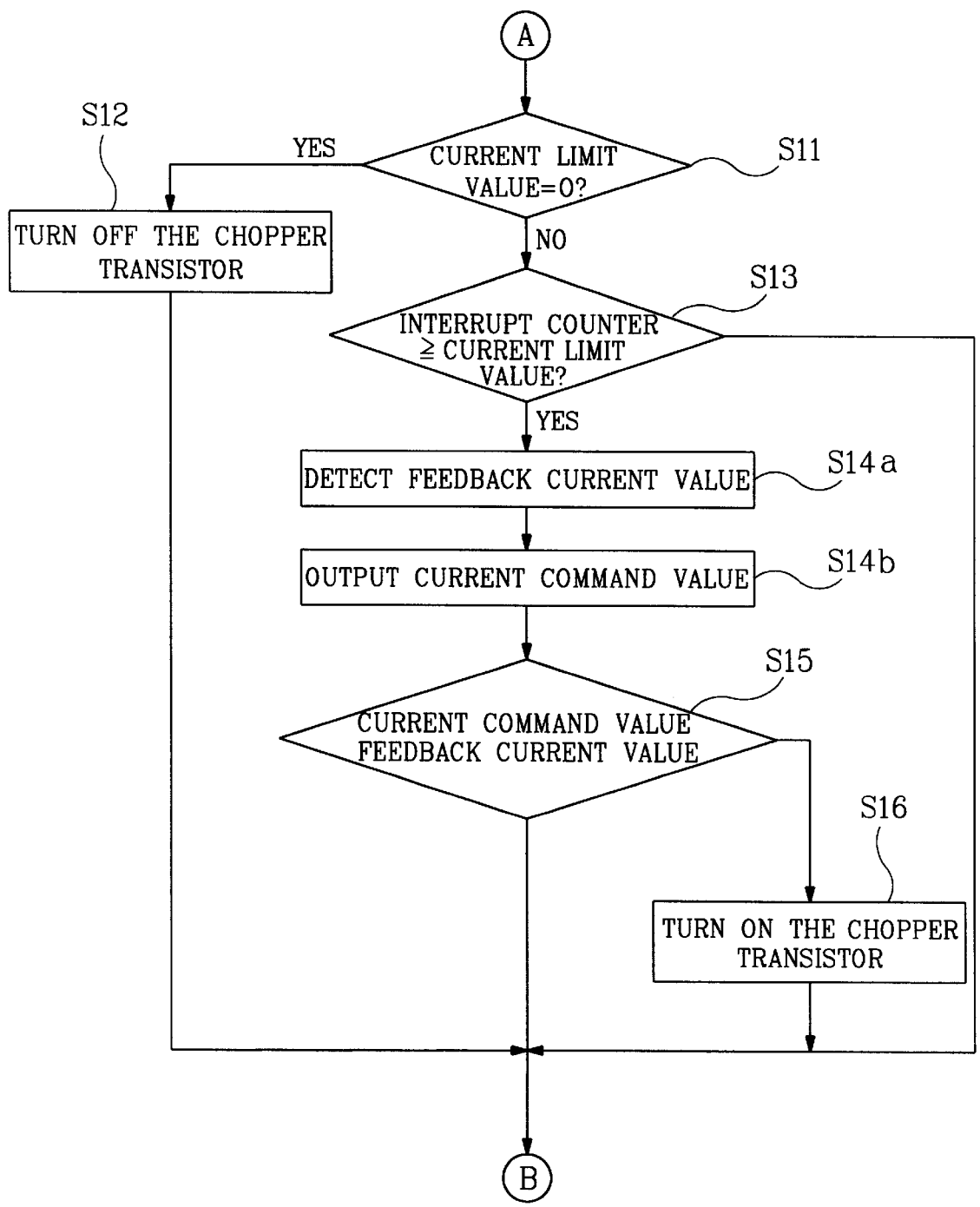

Microcomputer 11 generates a PWM signal of chopping frequency of 250 Hz at the output port in order to implement a low-power consuming PWM chopper circuit. The output information of the ON/OFF controller is detected via the input port and sequentially processed in the real-time interrupt subroutine so that the duty cycle is adjusted to equalize the average output current of the motor with the current command value. In microcomputer 11, a lockout time control function, whereby a limit to the chopper switching frequency is provided, is determined using software with the sampling time Ts2 of the ON/OFF controller's output information. The operation of the present invention with the above configuration is described with reference to FIGS. 3A and 3B.

Microcomputer 11 checks in step S1 whether there is trouble in the power control circuit of FIG. 1. If there is no trouble in step S1, it is checked in step S2 whether the operator manipulates the direction lever and accelerator. If there is trouble in steps S1 and S2 or the lever is determined not to be operated, microcomputer 11 turns off chopper transistor 6 in step S6 by changing the output pulse of the PWM signal into LOW.

Figure 4:
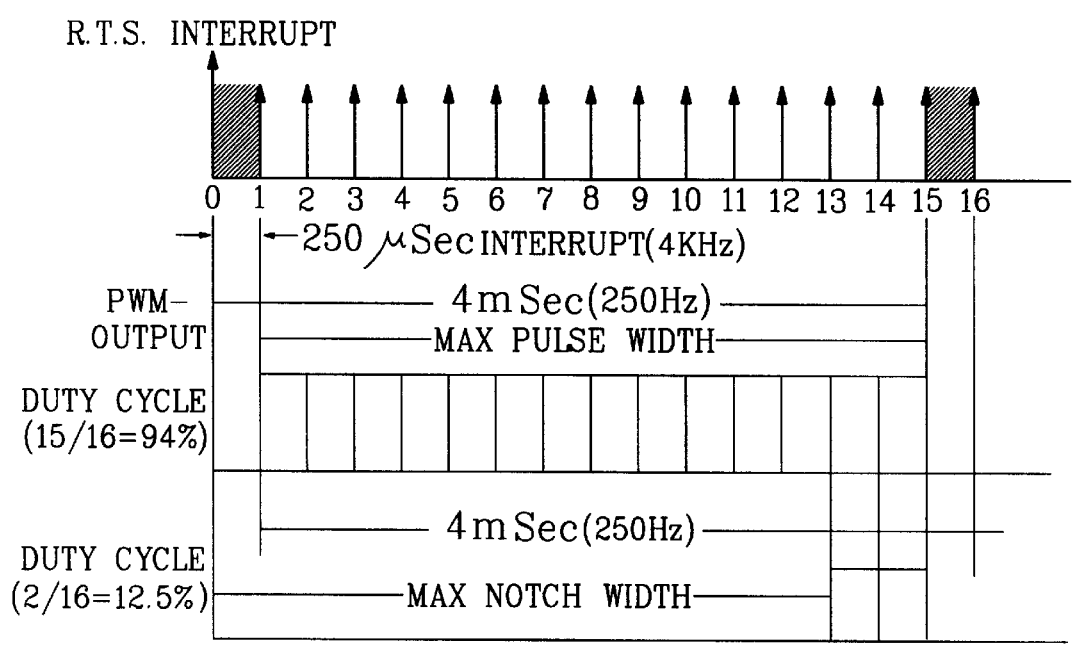
FIG. 4 is an output waveform of the pulse width modulator by the present invention.

If the direction lever and accelerator are determined to be operated in step S2, microcomputer 11 checks in step S3 whether the current interrupt counter is 0. Here, the output pulse of the PWM signal is divided into 16 interrupts as shown in FIG. 4. Each of the interrupts corresponds to pulse duty values of 1 through 15. In step S3 if the interrupt counter is determined to be 0, microcomputer 11 decides in step S4 whether or not the current state is regenerative/braking mode or bypass mode. If not in these modes, the start point of the initial "PULSE ON" of the PWM signal, pulse duty value, is set as the current limit value in step S5, and then the next step S6 progresses.

Meanwhile, if the interrupt counter is determined not to be 0 in step S3, microcomputer 11 determines in step S11 whether the current limit value is 0 or not. If not in step S11, microcomputer 11 decides whether the program is in the initial driving state. If not, microcomputer 11 detects in step S13 whether the count value of the interrupt counter is above the current limit value. If so, it is controlled in step S14a to detect the current presumed value, feedback current. Here, the feedback current value detected from current detector 13 is changed to a predetermined level by level shifter 16, and then amplified to a predetermined magnitude by feedback current amplifier 17. The feedback current amplified by feedback current amplifier 17 is input to ON/OFF controller 18, and microcomputer 11 outputs the current command value to D/A converter 14 in step S14b. The ON/OFF controller 18 compares the current command value input from low-pass filter 15 with the feedback current value input from feedback current amplifier 17, and then outputs the result to microcomputer 11. Microcomputer 11 decides in step S15 whether the current command value is above the feedback current value according to the comparison result output from ON/OFF controller 18. In this step S15, if so, microcomputer 11 converts the output pulse of the PWM signal into HIGH, turning on chopper transistor 6 in step S16. If the program is determined to be in the initial driving state in step S11, the output pulse of the PWM signal is changed into LOW, turning off the chopper transistor 6 in step S12. If in the regenerative/braking mode or bypass mode in step S4, the procedure jumps to the next step.

In step S7 the state of the interrupt counter increases, and in step S8 it is compared whether the state of the interrupt counter is 16. If the interrupt counter is at 16, then the interrupt counter is reset in Step S9. Subsequently, the microcomputer 11 performs in step S10 one of 16 different interrupt subroutines.

In order to control the turning ON/OFF of chopper transistor 6 while continuously repeating the above procedure to increase the interrupt by one, the output pulse duty value of the PWM signal is controlled so that the amount of current can be controlled, which is supplied to the motor system via chopper transistor 6. The following are the structure of the software and a PWM generating algorithm for driving chopper power circuit, which are briefly explained.

Figure 5:
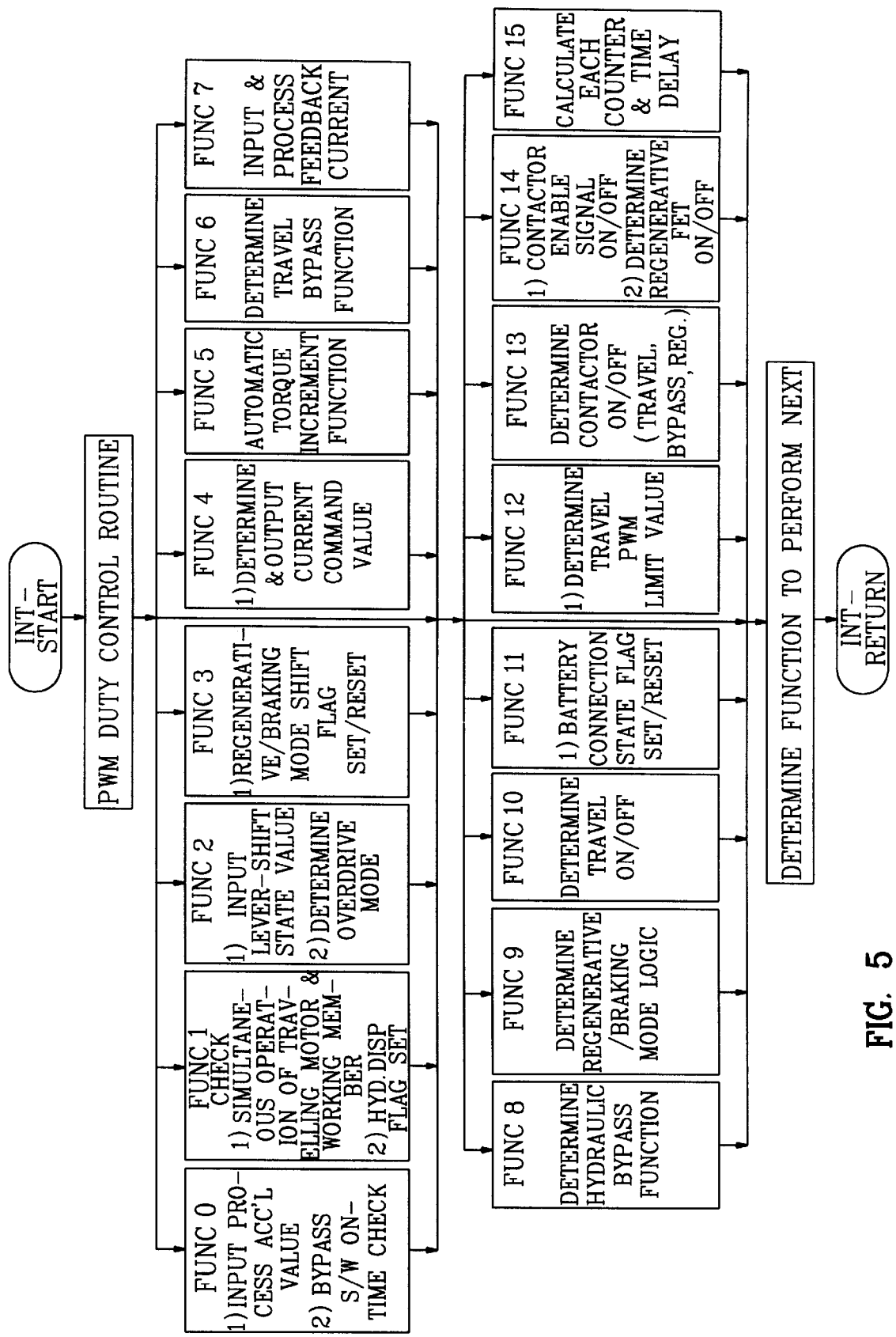
FIG. 5 is an PWM duty-control interrupt program configuration of the present invention.

The structure of the software is like FIG. 5, and real-time PWM duty-control interrupt routine is performed in the foreground part by applying the foreground/background system. In the background part the standard program is to be performed in the non-scheduled form.

The current controller is a system requiring real-time operation so that the software also needs real-time operating system therefor. The controller's software operates with the 250 μs interrupt subroutine mainly by real-time scheduler (R.T.S.) 16-level program modules for the respective function implementation in the presence of interrupt are provided to detect the present current state and operating mode of the system so that the ON/OFF state of the PWM signal, i.e., the gate driving signal of the chopper power circuit, is determined and the signal is output. The ON-DUTY length of the PWM signal is varied in units of $\frac{1}{16}$ if the integral coefficient of the real-time interrupt, 16-unit (250 μs×16=4 ms: 250 Hz PWM frequency), is taken as one period (4 ms) so that a proper digital PWM signal waveform is adoptively generated as well as does the nonlinear operation in accordance with the status detection of the operation system compensate. FIG. 4 shows the time chart for sequentially generating the PWM signal.

The object of the present invention is to provide a current controller combined with good response characteristics of non-linear bang-bang control (ON/OFF controller) and the reliable characteristics of feed control that is capable of obtaining intended control performance even in the presence of uncertainty of system due to modeling error and external disturbance, in order to implement a current-type PWM controller with a hardware structure simpler than the PID plus bang-bang controller and less real-time software load in case of minimum time torque control using a DC series motor under the condition of improper factor of load. In addition, because the phase of the PWM signal can be detected in a computer, the present invention provides a torque controller for motor characterized in synchronizing the PWM waveforms in order to mutual exclusion function for preventing the reduction of battery service life caused due to overcurrent when two motors run simultaneously in a system using a limited battery as the driving source.

What is claimed is:

1. A current control apparatus for a DC motor system having a motor field coil and a motor armature and driven by a power source, and a chopper transistor for controlling amount of current supplied to the DC motor from the power source, comprising:

current amplifying means for detecting a feedback current value at a rear end of the motor and amplifying the feedback current value;

on-off control means for comparing an input command current value with the amplified feedback current supplied from said current amplifying means and outputting an on-off control signal as a function of the comparison; and a microcomputer for controlling a duty value of an output pulse wave of a predetermined frequency generated as a function of the on-off control signal and thereby controlling an on-off time of the chopper transistor, said microcomputer having:

a pulse-width modulator for generating said output pulse, said modulator having an interrupt counter for counting a plurality of state values;

means for determining whether said interrupt counter is in an initial state;

means for setting a pulse-duty value of output pulse from the pulse-width modulator to a predetermined current limit value when said interrupt counter is in the initial state;

means for determining, when said interrupt counter is not in the initial state, whether the predetermined current limit value is 0;

means for comparing, if the predetermined current limit value is not 0, the state of said interrupt counter with the predetermined current limit value and thereby controlling an on-off state of said chopper transistor; and means for turning off said chopper transistor if the predetermined current limit value is 0.

2. The current control apparatus according to claim 1, wherein said microcomputer further comprises:

means for comparing, when the state of said interrupt counter is above the predetermined current limit value, the input command current value with the amplified feedback current and turning on said chopper transistor if the input command current value is above the amplified feedback current.

3. The current control apparatus according to claim 1 or claim 2, wherein said microcomputer further comprises:

means for performing one of a plurality of predetermined PWM duty-control interrupt subroutine programs according to the state of said interrupt counter, said PWM duty-control interrupt subroutine programs carrying out the following functions of:

detecting a current state of, and an operating mode of, a system as a function of the on-off control signal;

determining a state of the output pulse from said pulse-width modulator and outputting the output pulse;

increasing the state of interrupt counter; and changing an on-duty length of said output pulse according to the state of interrupt counter and thereby controlling an amount of current supplied to the DC motor.

4. A method of controlling a current supplied to a DC motor from a power source by means of a current control apparatus, said DC motor having a motor field coil and motor armature and said current control apparatus comprising a chopper transistor, on-off control means and a microcomputer having a pulse-width modulator with an interrupt counter, which method comprises the steps of:

detecting a feedback current value at a rear end of the motor and amplifying the current value;

comparing an input command current value with the amplified feedback current supplied from the current amplifying means and outputting an on-off control signal as a function of the comparison;

controlling a duty value of an output pulse generated as a function of the on-off control signal; and controlling an on-off time of the chopper transistor as a function of the duty value of said output pulse;

wherein said controlling the duty value of the output pulse comprises the substeps of:

determining whether said interrupt counter is in an initial state;

if said interrupt counter is in the initial state, setting a pulse-duty value of the output pulse from the pulse-width modulator to a predetermined current limit value;

if said interrupt counter is not in the initial state, determining whether the predetermined current limit value is 0;

if the predetermined current limit value is not 0, comparing the state of said interrupt counter with said predetermined current limit value and thereby controlling an on-off state of said chopper transistor; and if the predetermined current limit value is 0, turning off said chopper transistor.

5. The method according to claim 4, wherein said controlling the duty value of the output pulse further comprises the substeps of:

if the state of said interrupt counter is above the predetermined current limit value, comparing the input command current value with said amplified feedback current; and if said input command current value is above said amplified feedback current, turning on said chopper transistor.

6. The method according to claim 4 or claim 5, wherein said controlling the duty value of the output pulse further comprises the substep of:

performing one of a plurality of predetermined PWM duty control routine programs according to the state of said interrupt counter, said PWM duty control routine programs carrying out the following functions of:

detecting a current state of, and an operating mode of, a system as a function of the on-off control signal;

determining a state of said output pulse from the pulse-width modulator and outputting the output pulse;

increasing the state of interrupt counter; and changing an on-duty length of said output pulse according to the state of interrupt counter and thereby controlling an amount of current supplied to the DC motor.

\* \* \* \* \*